Nov. 17, 1959     K. H. KNIGHT     2,912,757

FRUIT AND VEGETABLE CUTTER

Filed Nov. 21, 1958

Inventor
Kenneth H. Knight
By Robert B. Benson
Attorney ated Nov. 17, 1959

2,912,757

FRUIT AND VEGETABLE CUTTER

Kenneth H. Knight, Milwaukee, Wis.

Application November 21, 1958, Serial No. 775,528

3 Claims. (Cl. 30—303)

This invention relates generally to cutting dies. More specifically this invention relates to cutters for fruits and vegetables.

Most cutting of fruits and vegetables that is done in the home kitchen is done with the aid of a paring knife. Therefore, in order to slice a fruit or vegetable such as a pickle or pear in a number of sections, a number of strokes of the knife are required. Furthermore, some skill is required to cut the article into a number of substantially equal and uniform pieces such as used in fancy salads and desserts. In addition a paring knife is somewhat unsafe to use especially in the hands of the unskilled cook.

The cutter of this invention overcomes the above mentioned problems encountered with paring knives by providing a plurality of cutting edges that center the object to be sliced and then simultaneously slices the object into a plurality of substantially equal and uniform sections.

Therefore, it is the object of this invention to provide a new and improved cutting die that has a plurality of blades.

Another object of this invention is to provide a new and improved cutter for slicing fruits and vegetables into a plurality of substantially equal, uniform sections.

Another object of this invention is to provide a new and improved fruit and vegetable cutter that is quicker, easier and safer to use than known prior art fruit and vegetable cutters.

Other objects and advantages will be apparent when reading the following description in connection with the accompanying drawing in which.

Figure 1:
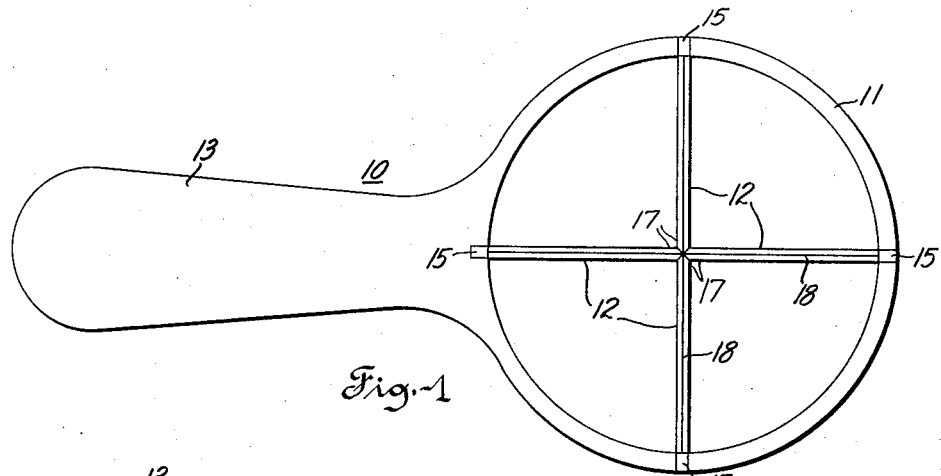
Fig. 1 is a top view of a cutter embodying this invention.
Figure 2:
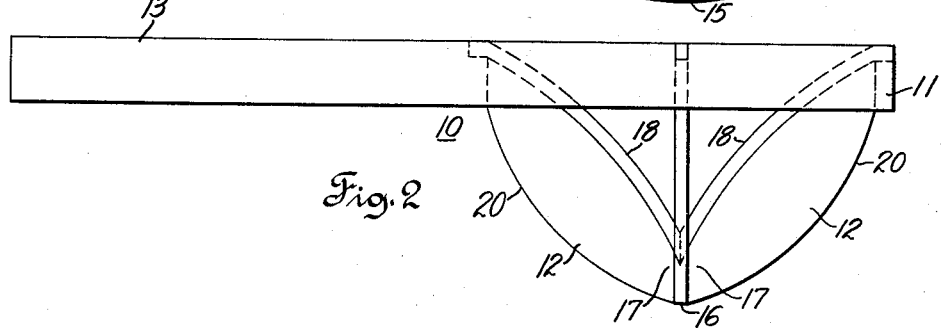
Fig. 2 is a side view of the cutter shown in Fig. 1.
Figure 3:
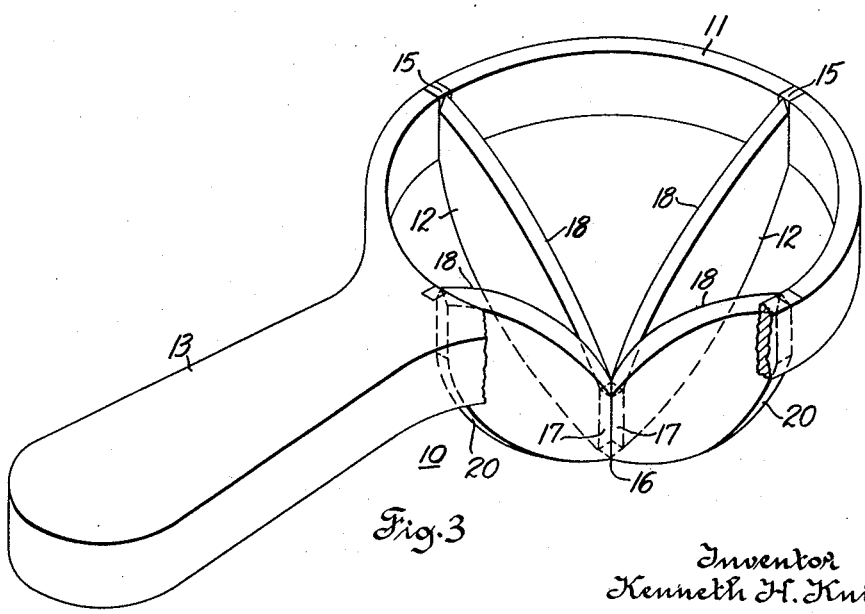
Fig. 3 is a pictorial view with parts removed of the cutter shown in Fig. 1.

As shown in the drawings the cutter 10 comprises a suitable frame 11 having a plurality of cutting blades 12. As shown the frame 11 is preferably annular but any other suitable configuration may be used. For convenience the frame may be provided with a suitable handle such as the one identified by the number 13 that extends outwardly from the frame in substantially the same plane. Only four blades are shown in the drawing but it is obvious that any number of blades could be used depending on the number and size of the slices desired to be cut.

The blades 12 are arcuately spaced around the periphery of the frame 11 and have their outer end 15 connected to the frame in any suitable way. Since a cutter of this type may be made of a suitable plastic, the entire cutter may be molded as a unit in which case the blades would be fused to the frame. The blades 12 extend inwardly and downwardly away from the frame 11 toward a point 16 that lies in a plane removed from the plane in which the frame lies. The other ends 17 of the blades 12 merge at the point 16 and may be suitably connected at that point to strengthen the cutter.

The inner edge 18 of the blades 12 are formed to define a suitable cutting edge. These inner edges 18 combine to define a substantially cone shaped outline having its base at the frame 11 and its apex at the point where the blades 12 are joined. This configuration causes an object that is inserted in the cutter to center itself relative to the cutter before being sliced. Then when the object is forced through the blades it is sliced into a plurality of substantially uniform equal pieces.

The outer edge 20 of the blades 12 can also be of any suitable configuration but as illustrated they are convex running from the frame 10 to the point 16. Since the blades are arcuately spaced, the cutter can be inverted, placed over a container such as a glass, and used as a fruit squeezer. Therefore, if the outer edges 20 of the blades 12 are convex as shown it greatly facilitates the squeezing of fruits such as oranges and lemons.

In operation the cutter 10 is held in one hand and with the cutting edges 18 of the blades 12 held upward. The object to be sliced is placed in the cutter and allowed to center itself. The object is then pushed slowly through the cutter. Some care should be exercised to keep the object centered during the slicing operation. If desired, the object may be pushed through the cutter with some kind of blunt device to avoid any possibility of injury on the blades.

Although only one embodiment of this invention has been illustrated and described, it will be apparent to those skilled in the art that various changes and modifications may be made therein without departing from the spirit of the invention or the scope of the appended claims.

The invention claimed is:

1. A fruit and vegetable slicer comprising a frame, a plurality of blades having one end connected to said frame at points spaced around the inner periphery of said frame, the other ends of said blades converging to and meeting at a point spaced from the plane of said frame for centering an article to be cut prior to cutting, the edge of said blades facing said frame being a cutting edge.

2. A fruit and vegetable slicer comprising an annular frame, a plurality of blades having one end connected to said frame at points spaced around the inner periphery of said frame, the other ends of said blades converging to and being joined at a point spaced from the plane of said frame for centering an article prior to slicing, the edge of said blades facing said frame being a cutting edge, the other edge of said blades being convex.

3. A fruit and vegetable slicer comprising a frame, a plurality of blades having one end connected to said frame at spaced apart points; said blades being inclined relative to said frame and being joined at a point, the edge of said blade facing said frame being a cutting edge whereby articles forced through said cutter are centered prior to slicing.

References Cited in the file of this patent

UNITED STATES PATENTS

| | | |
|---|---|---|
| 2,581,294 | Read et al. | Jan. 1, 1952 |
| 2,680,907 | Palosaari | June 15, 1954 |
| 2,813,335 | Ritter | Nov. 19, 1957 |